Sept. 4, 1923.

J. B. MERIAM

FLEXIBLE COUPLING

Filed May 16, 1921

INVENTOR
Joseph B. Meriam,
By Bates & Macklin,
ATTORNEYS

Patented Sept. 4, 1923.

1,467,185

UNITED STATES PATENT OFFICE.

JOSEPH B. MERIAM, OF CLEVELAND, OHIO.

FLEXIBLE COUPLING.

Application filed May 16, 1921. Serial No. 469,767.

*To all whom it may concern:*

Be it known that I, JOSEPH B. MERIAM, a citizen of the United States, residing at Cleveland, in the county of Cuyahoga and State of Ohio, have invented a certain new and useful Improvement in Flexible Couplings, of which the following is a full, clear, and exact description, reference being had to the accompanying drawings.

This invention relates to a flexible coupling for rotatably connecting shafts so as to allow a slight disalignment of the shafts relative to each other. An object of the invention is to provide a connection of this nature, which may be readily assembled and cheap in construction, and which will readily allow the slight disalignments necessary. Other objects of the invention will be apparent as the description progresses.

The novelty involved is specifically set forth in the claim.

Figures 1, 2:
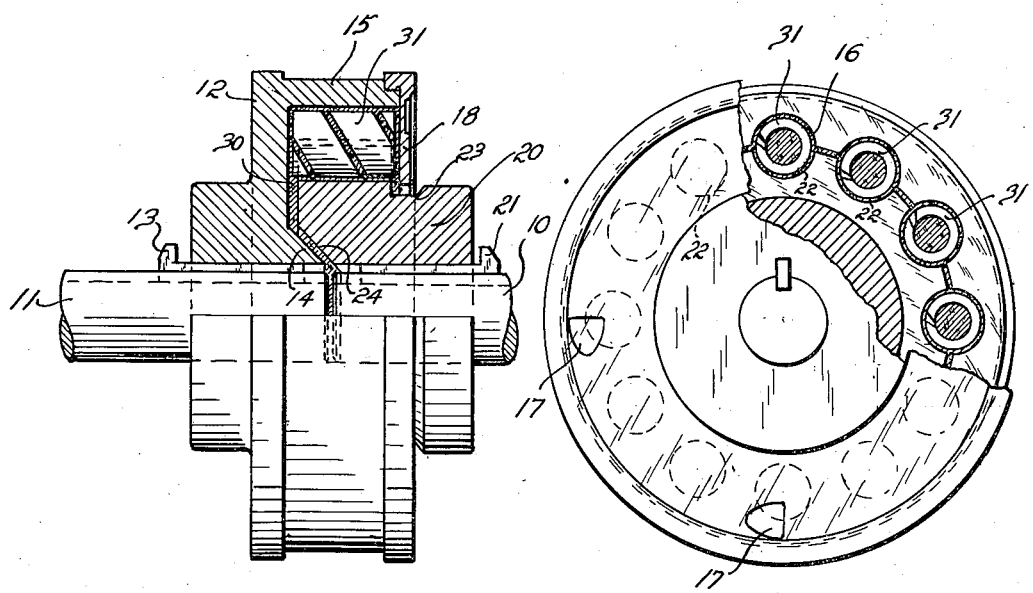
Figures 3, 4:
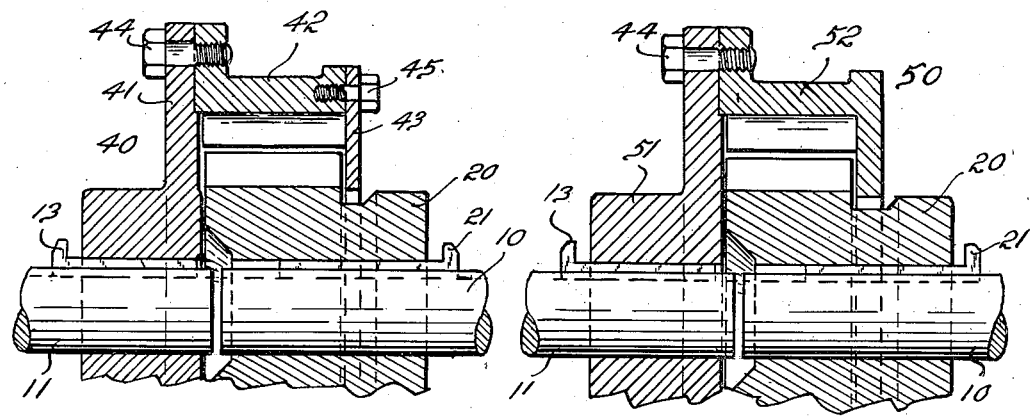
Figure 5:

In the drawing, in which embodiments of my invention are illustrated, Fig. 1 is a side view partly in section of a flexible coupling embodying my invention; Fig. 2 is an end view partly in section of the device shown in Fig. 1; Fig. 3 is a fragmentary view similar to that of Fig. 1, showing a slightly different embodiment; Fig. 4 is a view similar to Fig. 3, but showing a still different embodiment of my invention; Fig. 5 is a detail of a connecting roll which may be used in locking the coupling members against relative rotation.

Referring particularly to the device shown in Figs. 1 and 2, numerals 10 and 11 represent the two shafts which are to be flexibly coupled. The housing 12 is keyed or otherwise non-rotatably attached as at 13 on the shaft 11. This housing is in the form of a hollow cylindrical housing open at one end and has a frustro-conical projection 14 at its center. The cylindrical walls 15 are provided with arcuate recesses 16 spaced at intervals on the inner surface of these walls. In order to connect the shaft 10 to the shaft 11, a cylindrical plug 20 is keyed on the shaft 10 as at 12, or may be otherwise non-rotatably attached thereto. The outer portion of the member 20 is provided with arcuate recesses 22, which correspond in number with the recesses 16 on the walls 15, each recess registering with and completing a corresponding recess 16, whereby the two form cylindrical recesses. The central portion of the member 20 has a central conical recess 24 therein, adapted to receive the conical projection 14 of the housing 12.

Elastic packing material 30, such as ground cork and grease or the like, is placed in the recesses and occupies the space between the housing and plug. In order to lock the plug and housing against relative rotary motion, suitable locking means, such as the rolls 31, are inserted in each pair of registering openings in the plug and housing. These rolls are of less size than the openings and the elastic packing material which fills the intervening space renders the coupling connection flexible to allow the desirable slight disalignments of the shafts. Any form of loose fitting device might be employed to occupy these openings, but I have found that a type of roller bearing which may be obtained on the market is admirably suited for this purpose. The rolls illustrated are made by spirally winding metal strips on a rod or mandrel and then cutting them into cylinders of the desired length, whereby cylindrical shells are obtained, having grooves providing communication between the interior and exterior thereof throughout their entire length, which rolls may be readily forced into the packing previously placed in the space between the housing and plug. This method of assembling insures the complete filling of the space with packing material, though, of course, the rolls may be first placed in position and the packing subsequently inserted if desired. The outstanding feature of these devices, however, whatever form they may take, is that they do not completely occupy the recesses and the intervening space is filled by some form of elastic packing, whereby a yielding connection allowing the necessary though slight disalignments of the shafts is provided. This form of connection also serves as a shock absorber on account of its resiliency, so that the shock of any sudden change of speed of rotation of one of the shafts is taken up as well as any slight transverse disalignment.

An annular cover member 18 adapted to retain the packing 30 and rolls 31 in the housing is suitably attached to the housing 12 as by means of threads, as shown, and may have sockets 17 formed thereon, whereby it is adapted for manipulation by a spanner wrench. The member 18 is annular in form and its inner diameter is preferably slightly less than the outer diameter of the member 20, but it is made of flexible material so as to enable it to pass over this member and into the circumferential notch 23 formed thereon.

In Fig. 3 a slightly different form of housing has been shown, the other members being the same as in the construction before described. In this view a housing 40 is shown, consisting of separable members 41, 42 and cover 43, which may be connected together by suitable means such as bolts 44 and 45. The member 42 is serrated in the same manner as in the other modification.

In Fig. 4 a still further slight modification is shown, the housing 50 in this case being composed of members 51 and 52, the cover portion being made integral with the circumferentially extending member 52.

It will, of course, be understood that the packing and rolls are used in the same manner in the modifications shown in Figs. 3 and 4 as in that of Fig. 1. A distinct advantage, however, of the structure shown in these modifications consists in the fact that the shafts may be separated without either removing the keys 13, 21 or the packing 30 and rolls 31 from the housings.

It will be noticed that the projection 14, which is shown in Fig. 1, is omitted from the housings in the modifications in Figs. 3 and 4, and that by removing the bolts 44, the housings may be separated on a plane transverse to the shafts and adjacent their ends, this enables the housings 40 or 51, together with their shafts 11 to be moved transversely of the corresponding shaft 10 and separated therefrom, the rolls 31 and the packing in the registering recesses remaining in place both in the housing and on the shaft 10, such a construction may be very desirable where, for instance, the shaft 11 is to be coupled at each of its ends to a shaft corresponding with shaft 10, and in which it may be desirable sometimes to remove shaft 11 bodily.

In the form shown in Fig. 1, it would be necessary to move the shafts longitudinally, and furthermore, to pull the housing off from the plug which would involve removal of the rolls 31 either from the plug or the housing, and some consequent disarrangement of the packings. It is, of course, to be understood, however, that the housings shown in Figs. 3 and 4 might be provided with the conical projection such as that of 14 in Fig. 1, and still provide for transverse separation of the shafts, after a slight longitudinal motion thereof, and it will be seen that in such a case the shafts could still be separated without serious disarrangement of the rolls 31 or the packing about them.

It will be seen, however, that in the form shown in Fig. 1, it is also possible to separate the shafts without a complete dismantling of the coupling and without movement of either key. This will be accomplished by removing cover 18 and separating the shafts longitudinally, this motion being slightly greater than would be necessary in the other embodiments shown, since it would require a motion practically equal in amount to the height of the cylindrical wall 15 so as to enable it to clear the plug 20.

It will, therefore, be seen that I have provided a coupling which will permit a slight transverse flexing of the rotating shafts during operation, but will prevent any wobbling thereof, and which firmly locks them against relative rotation. It will also be seen that my structure provides a ready means for separating these shafts, which does not require either the removal of keys or the complete dismantling of the coupling.

Having thus described my invention, I claim:—

1. In a flexible coupling, the combination with a driving and driven member each having oppositely disposed registering apertures, of means disconnected from said members and adapted to occupy said apertures, and packing surrounding said means and adapted to fill said apertures, whereby power is transmitted from the driving to the driven member through the packing and said disconnected means.

2. In a flexible coupling, the combination of two members, one surrounding the other, registering notches in the two members, and yielding locking devices in the registering notches, said devices comprising tubular rolls having a hollow interior packed with elastic packing, whereby said rolls may be compressed.

3. In a flexible coupling, a housing having notches in its inner periphery, a plug extending into said housing, and having notches in its edge, loose hollow devices occupying registering notches in the two members and elastic packing within the hollow devices and in the notches surrounding said hollow devices.

4. In a flexible coupling, shafts, a housing keyed on one of said shafts, a plug on the other shaft and extending into said housing, notches in the inner surface of the housing wall, notches in the exterior surface of the plug, loose devices in registering notches in such two members, load bearing packing between said housing and plug, and an annular cover on said housing for retaining the packing in the housing.

5. In a device of the class described, two shafts, means for flexibly connecting said shafts comprising a housing on one of said shafts, a member on the other shaft projecting into said housing, said member having a circumferential notch formed thereon, packing between said member and housing said housing having a portion projecting into said notch for retaining the packing in position, said member and housing each having semi-cylindrical notches in the peripheral face presented to the other member, hollow rollers occupying said notches, for holding the member and housing against relative rotation, and elastic packing within the hollow rollers.

6. In a device of the class described, a shaft, a recessed member thereon, a second shaft having a housing thereon and surrounding said member and provided with recesses therein registering with the recesses of the first member, and hollow rolls in said registering recesses, said rolls having passageways through them, and packing within said rolls, said packing being also disposed between the rolls and housing and serving with the rolls to transmit power from one shaft to the other.

7. In a flexible coupling, the combination of two rotary members, one having a cup-shaped cavity into which the other loosely projects, the first member having inwardly facing circumferentially arranged notches, the second member having cooperating outwardly facing circumferentially arranged notches, hollow members loosely occupying said notches in the two members, a packing of grease and ground cork within the hollow member, and a flange-like guard secured to the outer member and projecting radially inward across the combined notches to retain the hollow members and packing in place.

In testimony whereof, I hereunto affix my signature.

JOSEPH B. MERIAM.